United States Patent

Dannenberg et al.

[11] Patent Number: 5,993,314
[45] Date of Patent: *Nov. 30, 1999

[54] METHOD AND APPARATUS FOR INTERACTIVE AUDIENCE PARTICIPATION BY AUDIO COMMAND

[75] Inventors: Roger B. Dannenberg; Andrew P. Witkin, both of Pittsburgh; Robert N. Fisher, Bellefonte, all of Pa.

[73] Assignee: Stadium Games, Ltd., Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/798,382

[22] Filed: Feb. 10, 1997

[51] Int. Cl.⁶ .............................................. A63F 9/22
[52] U.S. Cl. .................................. 463/1; 463/39
[58] Field of Search .................... 463/39, 36, 1; 348/61, 15; 434/306, 112; 235/51, 386; 364/521; 340/725; 345/327, 352

[56] References Cited

U.S. PATENT DOCUMENTS

| | | |
|---|---|---|
| 3,601,530 | 8/1971 | Edson et al. . |
| 4,141,548 | 2/1979 | Everton . |
| 4,662,635 | 5/1987 | Enokian . |
| 5,142,655 | 8/1992 | Drumm . |
| 5,149,104 | 9/1992 | Edelstein . |
| 5,210,604 | 5/1993 | Carpenter . |
| 5,365,266 | 11/1994 | Carpenter . |
| 5,735,743 | 4/1998 | Murata et al. . |

FOREIGN PATENT DOCUMENTS 2269670  2/1994  United Kingdom .

*Primary Examiner*—Michael O'Neill
*Attorney, Agent, or Firm*—Carothers & Carothers

[57] ABSTRACT

An interactive audience participation system which utilizes audio command signals, such as loudness or sound intensity, transmitted by different audience groups. These respective audio command signals are detected to determine the aggregate of the signals for each group and then the detected aggregates are converted into data. An audience sensed interactive communication medium device, such as a large stadium video screen, is correspondingly manipulated by the detected data so that the audience may play a competitive or collaborative game.

12 Claims, 3 Drawing Sheets

METHOD AND APPARATUS FOR INTERACTIVE AUDIENCE PARTICIPATION BY AUDIO COMMAND

BACKGROUND OF THE INVENTION

This invention relates to the field of human-computer interface techniques for a group (one or more) of people simultaneously interfacing to a computer.

In more recent years, a considerable amount of work has been accomplished to facilitate one-on-one interaction of a human and a computer. This interaction is bi-directional, human-to-computer and computer-to-human. The present invention relates to the human-to-computer direction.

Devices which are commonly used for this purpose include the computer keyboard, mouse, light pen, track-ball, microphone, retroflective device, and, through the MIDI communication channel, a wide variety of musical instruments.

In the situation where the audience controls the course of action being sensed or viewed by the audience, common techniques utilized are wired seats, radio transmitters and retroflective devices. As a representative example of the latter mentioned device, see U.S. Pat. No. 5,210,604 for Method and Apparatus for Audience Participation by Electronic Imaging.

Electronic signaling devices used by a participating audience usually consists of buttons, switches, dials, etc. which are hard wired to the audience seats for manipulation by the people occupying the seats. Other methods for audience participation utilize retroflective devices which are illuminated from a light source and viewed by a video camera, as disclosed in the aforereferenced patent.

In yet other such audience participation systems, radio transmitters are utilized, however this procedure is relatively expensive.

It is a principal object of the present invention to provide a method and apparatus for interactive audience participation which utilizes audio command signals transmitted by the audience, thereby eliminating the requirement of expensive transmitters, hard wiring to audience seats, or the necessary requirement of extra hand held devices, such as retroflective signaling devices.

SUMMARY OF THE INVENTION

The system of the present invention provides interactive audience participation wherein respective groups of an audience interactively control a communication medium device in their presence for entertainment, educational or statistical purposes.

In the system of the present invention, each person of the audience has the capability of transmitting predetermined parameters of audio command signals. For example, the predetermined parameters which are regulated in the audio command signals transmitted may be audio intensity or loudness, audio frequency or pitch, or audio sounds or phoneme (voice or speech recognition). These audio command signals are preferably merely generated by the respective voices of the audience, or secondarily by audio generating devices, either mechanical or electronic audio generating devices.

The live audience is thus divided into groups for the purpose of competition or cooperation in interactive audience participation and the audio command signals transmitted respectively by these difference audience groups, each consisting of at least one person, are respectively detected and the aggregate of the command signals for each determined.

Through the use of modern day computer techniques, the detected aggregate of the command signals for each group are converted into data and respective group parameters for an audience sensed interactive communication medium device are correspondingly manipulated with the detected group data.

The interactive communication medium device which is being controlled by the audience may be any one of a number or combination of known devices, such as large or small video displays, audio displays using loud speakers, audio visual displays of any size and remotely controlled vehicles which can be controlled through the cooperation or competitive command signals generated and transmitted by the respective audience groups.

While the interactive audience participation system of the present invention may be used for scientific or educational purposes, it will generally more readily be utilized as a game that permits an audience, such as spectators of a sporting event, to participate in games.

In this scenario, the audience is divided into competing groups or cooperating interacting groups. Through the use of microphones, audio command signals generated and transmitted by the respective groups are detected. Such command signals might technically be shouting, such that the participants need no special equipment.

Through the use of present day electronic computer equipment, the commands are processed and controlled to yield input signals for an appropriate video game, remotely controlled vehicle, or other interactive communication medium device which is being viewed by the audience for thereby providing feedback to the participants. For example, video games, remotely controlled vehicles, computer simulations, and other interactive systems are utilized to provide an element of play.

In a sports stadium, such interactive communication medium devices might consist of or include a large outdoor stadium video display, or a remotely controlled vehicle on the playing field which is competitively or cooperatively controlled for movement on the field. For example, in a football game the vehicle could in fact be a motorized vehicle which has a body shaped in the configuration of a football and the vehicle is thus competitively moved toward opposite goals by their respective audience groups, depending upon their ability to shout or otherwise provide another appropriate required audio parameter, such as voice pitch or frequency.

BRIEF DESCRIPTION OF THE DRAWINGS

Other objects and advantages appear hereinafter in the following description and claims.

The accompanying drawings show, for the purpose of exemplification, without limiting the invention or claims thereto, certain practical embodiments illustrating the principles of this invention wherein:

DETAILED DESCRIPTION OF THE INVENTION

Figure 1:
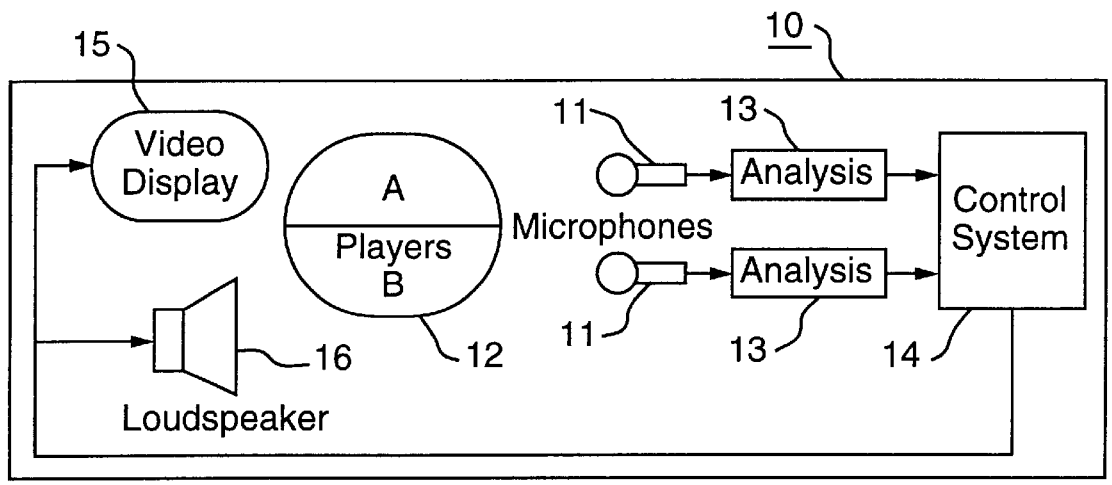
FIG. 1 is a schematic block diagram illustrating the interactive audience participation system of the present invention.

Referring to FIG. 1, the interactive audience participation system 10 of the present invention is schematically illustrated.

The microphones 11 receive or capture sound from the audience 12, which are players, for example the crowd in a sports stadium. The players 12 are divided into two groups A and B, and each group is sensed by separate directional microphones 11 or sets (not shown) of separate microphones 11. Two such microphones are shown in FIG. 1, but any number of microphones for each group may be utilized.

Several different approaches may be utilized to isolate the sounds from the different groups A and B. The microphones 11 may be directional, for example standard cardioid-pattern directional microphones, microphones with reflecting dishes, or "shot-gun" directional microphones. Alternatively, microphones 11 may be placed close to the participants or players 12 of the audience, using the fact that sounds from nearby participants will be stronger than sounds from far away participants in another group.

The audio command signals from each microphone 11 is sent to two corresponding respective audio detectors or analyzers 13. The audio command signals being sensed or detected from microphones 11 may travel through standard microphone cables as indicated, or, in a large system, the signals may be transmitted conventionally via radio or light transmission to a central receiver.

The two audio detectors 13 are adapted for detecting the audio command signals transmitted by the different audience groups A and B, which groups will consist of at least one person, and the signals are there aggregated for each group. In other words, the microphone signals are analyzed and aggregated in the detectors 13 to produce one or more control signals.

In the simplest form, the predetermined parameter of the audio command signal which is being measured or detected is loudness or intensity. For example, in detectors 13, the average power of the signal can be computed at frequent intervals of time to yield aggregated time-varying control information.

As other examples of the predetermined parameter of the audio command signals which can be measured or detected, audio frequency or pitch, or audio sounds or phonemes can be detected or measured instead of sound intensity or loudness.

For example, if pitch or frequency is the audio parameter being detected, some measure of group A and B's average pitch can be determined as an aggregate by computing the centroid of the amplitude spectrum, since it is unlikely that a group could produce a well defined single pitch. A typical aggregating procedure would be to digitize the input signal using a standard analog-to-digital converter, capture a predetermined number of samples, multiply the vector of samples by a predetermined windowing vector (such as a Hamming window), compute the discrete Fourier transform of the samples, convert the magnitude of the discrete Fourier transform, and finally compute the centroid of this magnitude.

The third example of sound parameters which might be detected are speech sounds using speech-recognition techniques, various phonemes or even words may be recognized. These may be used by the group to issue specific predetermined commands. Alternatively, the degree to which the group sound matches one speech sound versus another, can provide a continuous control parameter.

The analysis carried out by detectors 13 can be performed by special purpose hardware, by digital signal processors, or by using one or more general purpose computers. FIG. 1 shows a separate detector for analyzing each signal, but multiple analyses may also be performed by a single piece of equipment with multiple inputs and outputs.

Figure 2:
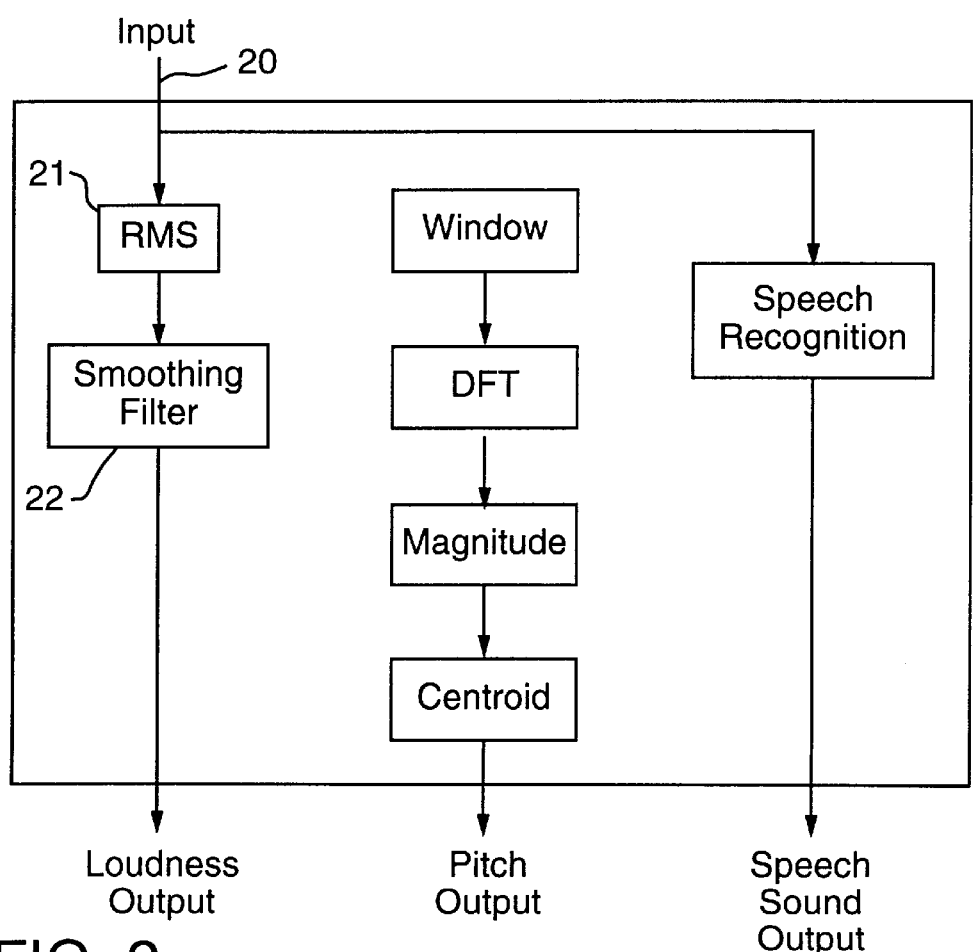
FIG. 2 is a schematic block diagram illustrating the contents of the audio detectors utilizing the system of the present invention for detecting audio command signals transmitted by different audience groups.

Referring to FIG. 2, the analysis process carried out by detectors 13 for aggregating audio command signals is shown in greater detail. The command signal or signals being detected are introduced in input 20 in digital form. The input, consisting of a fixed number of amplitude samples, is used by three independent processing sequences. On the left of FIG. 2, a root-mean-square (RMS) value 21 is computed for the samples, and the result is passed into a smoothing filter 22 to yield a measure of loudness as indicated. In the middle of the figure, the pitch analysis described earlier is implemented. On the right side of the figure, speech processing is used to recognize speech sounds, such as "yes" and "no". Other analyses are also possible.

Accordingly, audio detectors 13 detect the audio command signals transmitted by different audience groups and thereby determine the aggregate of the signals for each group and then convert the detected aggregate of the signals for each group into data. The results of this analysis are then sent to a control system 14 for correspondingly manipulating respective group parameters for a given image continuously displayed by an audience sensed interactive communication medium device with the group data.

Control system 14 uses the analysis to control in this instance an electronic game as the audience sensed interactive communication medium device. For example, loudness may control the speed of a runner or a direction of movement of a vehicle. Two examples of such games are described hereinafter. In FIG. 1, the output of the audience sensed interactive communication medium device which is manipulated by the audience group is illustrated in the form of video display 15 and loud speaker 16.

The control system 14 can be a special-purpose computer as in a video game, or a general purpose computer, possibly the same machine which is used for analysis in detector 13. Included in the control system 14 is a simulation of various objects, such as runners, obstacles, balls, and terrain. At least some of the objects providing a given image for manipulation have parameters that change dynamically in response to control signals. The control system also generates images and sounds that correspond to the configuration of simulated objects of the given image displayed and to event conditions within the simulation, which are ultimately displayed on stadium video display 15 and loud speaker system 16 in the presence of the audience.

The output of control system 14 is a depiction of the elements of the game using some combination of given images of video, audio, mechanical devices, fireworks, lights, vehicles, robots, or other audience sensed interactive communication medium devices. The system output is watched and/or heard by the players of the audience. In the example illustrated in FIG. 1, a large outdoor video stadium display 15 and a stadium PA loud speaker system 16 are utilized.

The total configuration of the system of the present invention creates an interactive system in which players can control and respond to the progress of the game, as depicted by given video images and sound.

Next, example games which can be carried out by the interactive audience participation system of the present invention are described.

In a first example, a tug of war game is played. In this game, the participants are divided into two groups A and B: Group A being on the left side of the screen and Group B on the right side of the screen. A computer generated video display shows a given image two groups of people pulling in opposite directions. When the left group of participants yell, animated characters pull to the left. Similarly, when the right group yells, animated characters pull to the right. A group "wins" when their characters pull the other characters over a center line in the video display 15.

Figure 3:
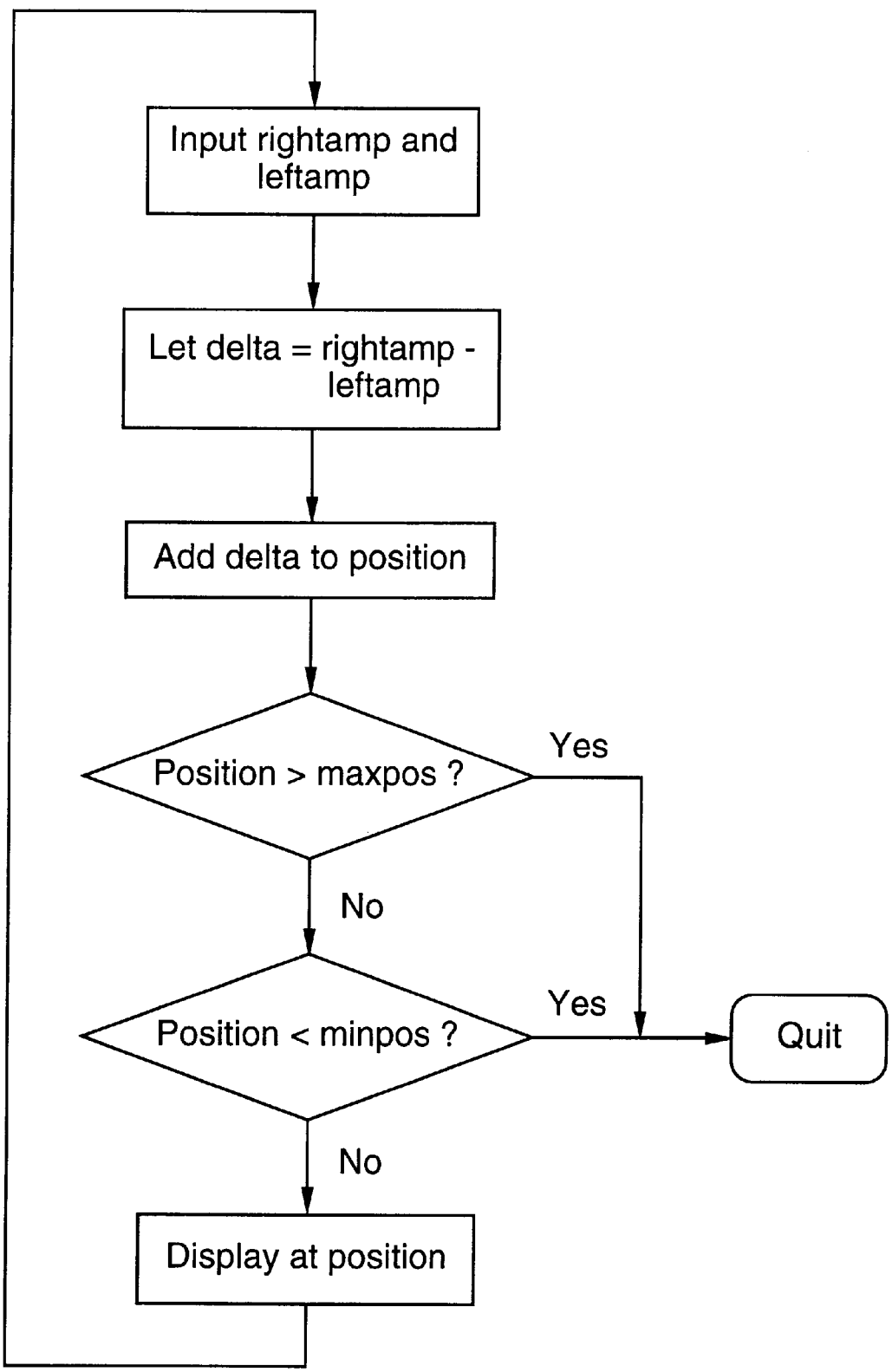
FIG. 3 is a diagrammatic flow chart for computer software implementation of a tug of war game which may be implemented as an example by the system of the present invention.

The computer driven implementation of the tug of war game is carried out as indicated by the software flow chart of FIG. 3.

Computation is performed at regularly spaced time steps. At each step, the aggregate of the control signals are computed from the amplitude of each input signal. The difference between right and left amplitude is then computed. The difference is scaled by a predetermined factor and added to a position accumulator to provide group control data. An image is drawn at a position based on the position accumulator and displayed. When the position accumulator exceeds a predetermined positive or negative threshold, the game ends, all as depicted on the software flow chart of FIG. 3.

A second game example which can be played with the interactive audience participation system of the present invention is one that incorporates vehicle navigation.

In this game, the participants must drive a remotely controlled vehicle in the shape of a football to the end zone of a football field. Spectators are divided again into two groups A and B. One group controls the speed of the vehicle, and the other group steers. In order to go straight, the steering group must make a sound that is medium loud. Softer sounds will turn the vehicle left and louder sounds will turn it right. Alternatively, the left group might control the left wheel and the right group might control the right wheel. Overall volume makes the vehicle move forward, and relative volume makes the vehicle steer. The vehicle stops when it enters the end zone.

In this example, the audience participants are required to cooperate with each other instead of competing.

Figure 4:
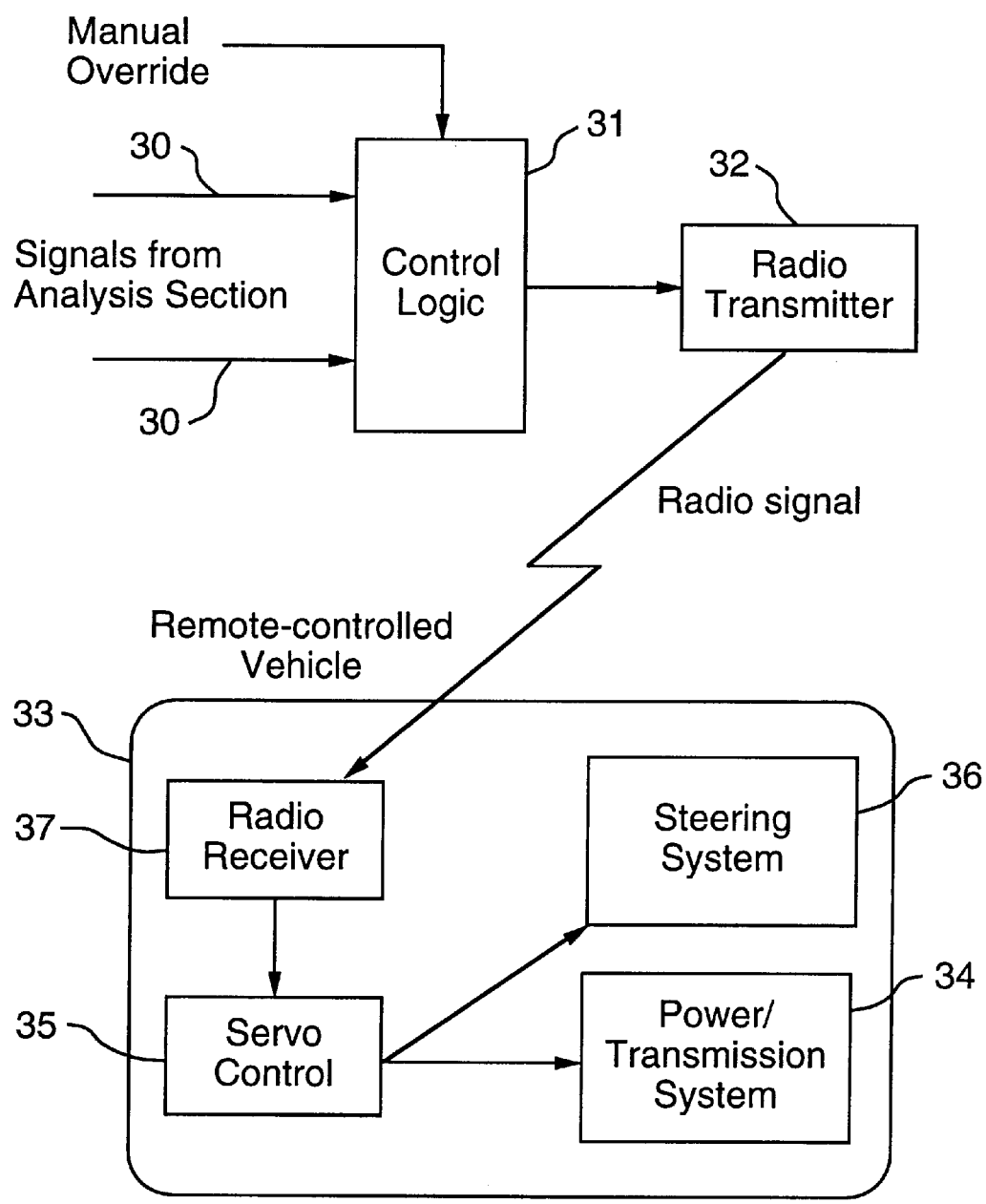
FIG. 4 is a schematic block diagram of an embodiment of the interactive audience participation system of the present invention illustrating the implementation of a remotely controlled vehicle in accordance with the principles of the present invention.

The implementation of this vehicle navigation game is carried out as indicated hereinafter with reference to the schematic diagram of FIG. 4.

Amplitude signals from the detectors 13 of FIG. 1 are input at 30 to control logic circuit 31 where they are scaled and combined by predetermined factors to provide aggregated data and transmitted by radio transmitter 32 to remotely controlled vehicle 33. Vehicle 33 is battery powered as indicated by power/transmission system 34 and has a servo-controlled speed adjustment 35 and a servo-powered steering system 36. The signals received by radio receiver 37 are used to control servo actuators (not shown). When the vehicle enters the end zone an operator manually overrides the speed control to stop the vehicle.

Any number of games are possible by changing the control system 14 in FIG. 1. Games may be competitive in which groups A and B participants compete, or games may be cooperative or collaborative toward a single collective goal. Examples of competitive games include football (one group controls a runner, while another group tries to tackle the runner), baseball (one group controls the pitch, while another group controls a batter), hockey (one group controls the puck, while another group controls the goalie), and other sports. Collaborative games include white water rafting (one group paddles to the left, another paddles to the right), navigating in a maze, flight simulation (one group controls the elevator, another group controls the ailerons).

We claim:

1. A method of interactive audience participation for reactive entertainment, comprising the steps of:

simultaneously detecting predetermined parameters of audio command signals transmitted respectively by separated audience groups and thereby determining and providing aggregate signals for each group;

generating respective drive signals corresponding to the detected aggregate signals for each group;

providing an interactive communication medium device which continuously displays a given image to an audience; and manipulating the interactive communication medium device with said drive signals and thereby interactively and simultaneously manipulating said given image with said drive signals in dependance on values related to respective properties of said aggregate signals.

2. The method of claim 1, wherein the step of detecting comprises using microphones.

3. The method of claim 1 wherein the step of detecting comprises detecting audio intensity parameters as the predetermined parameters of audio command signals being detected.

4. The method of claim 1, wherein the step of detecting comprises detecting predetermined parameters of audio command signals selected from a group of parameters consisting of audio intensity, audio frequency and audio sounds.

5. The method of claim 1, wherein the step of manipulating comprises manipulating group parameters of an audience sensed interactive communication medium device selected from a group of devices consisting of video displays, audio displays, audio-visual displays and remotely controlled vehicles.

6. The method of claim 1, wherein the step of manipulating comprises manipulating group parameters of a remotely controlled vehicle.

7. An apparatus for interactive audience participation for reactive entertainment, each person of an audience having the capability of transmitting predetermined parameters of audio command signals, comprising:

an interactive communication medium device which continuously displays a given image to an audience;

at least two audio detectors for simultaneously detecting audio command signals transmitted by separate audience groups consisting of at least one person and for thereby determining and providing aggregate signals for each group;

signal generating means for generating respective drive signals corresponding to the detected aggregate signals for each group for driving the interactive communication medium device;

said signal generating means connected to said interactive communication medium device for interactively and simultaneously manipulating said given image with said drive signals in dependance on values related to respective properties of said aggregate signals.

8. The apparatus of claim 7, wherein said audio detectors include microphones.

9. The apparatus of claim 7, wherein the predetermined parameters of audio command signals being detected are audio intensity parameters.

10. The apparatus of claim 7, wherein the predetermined parameters of audio command signals being detected are selected from a group of parameters consisting of audio intensity, audio frequency and audio sounds.

11. The apparatus of claim 7, wherein said interactive communication medium device is selected from a group of devices consisting of video displays, audio displays, audio-visual displays and remotely controlled vehicles.

12. The apparatus of claim 7, wherein said interactive communication medium device is a remotely controlled vehicle.

* * * * *